LINE TRACERS

Filed Oct. 10, 1961 3 Sheets-Sheet 1

WITNESSES
Bernard R. Gignac
Wm. B. Sellers.

INVENTOR
David L.A. Duff
BY
Wyman Diamond
ATTORNEY

Oct. 26, 1965 D. L. A. DUFF 3,214,661

LINE TRACERS

Filed Oct. 10, 1961 3 Sheets-Sheet 2

3,214,661

LINE TRACERS

David L. A. Duff, Burlington, Ontario, Canada, assignor to Canadian Westinghouse Company, Limited, Hamilton, Ontario, Canada Filed Oct. 10, 1961, Ser. No. 144,076
2 Claims. (Cl. 318—31)

This invention relates to the servo art and has particular relationship to line tracers in the operation of which a servo motor causes a tool, such as a cutting torch, to follow a line automatically. The position of the line is sensed by a sensing element such as a photo-sensitive device.

This invention has particular application to line tracer systems such as that disclosed in Patent 2,933,612 granted April 19, 1960 to Cheverton et al. and assigned to the same assignee which describes an automatic line following system. Such a system includes a photo sensitive device of very high impedance and a selective amplifier. The output of the amplifier supplies one of the quadrant windings of a servo steering motor with a signal that depends in amplitude and polarity on the deviation of the sensing device from the line. It is desirable in the interest of compactness and flexibility that the amplifier be of as small dimensions as practicable and it is an object of this invention to provide a line tracer having an amplifier of small dimensions. A further object of this invention is to provide a transistorized servo amplifier for controlling a servo motor from a high impedance photosensitive device.

In accordance with this invention a transistor amplifier for a high impedance photosensitive device is provided. One of the features of this invention is the amplification of the photosensitve device output by a preamplifier of the PNP–NPN type having a very high input impedance and a very low output impedance.

Another feature of the invention is the compensation in the servo loop for phase shift in the system.

Another feature is an output amplifier of the push-pull type energized from a single transistor device.

The apparatus according to the invention also has provisions for indicating the servo mechanism is operating properly, and preventing the system from wandering in the absence of the suitable input signal.

A clearer understanding of this invention will be had from the following figures in which:

FIGURES 3 and 4 are included for the purpose of aiding those skilled in the art in practicing this invention and not with any intention of limiting the scope of the invention.

Figure 1:
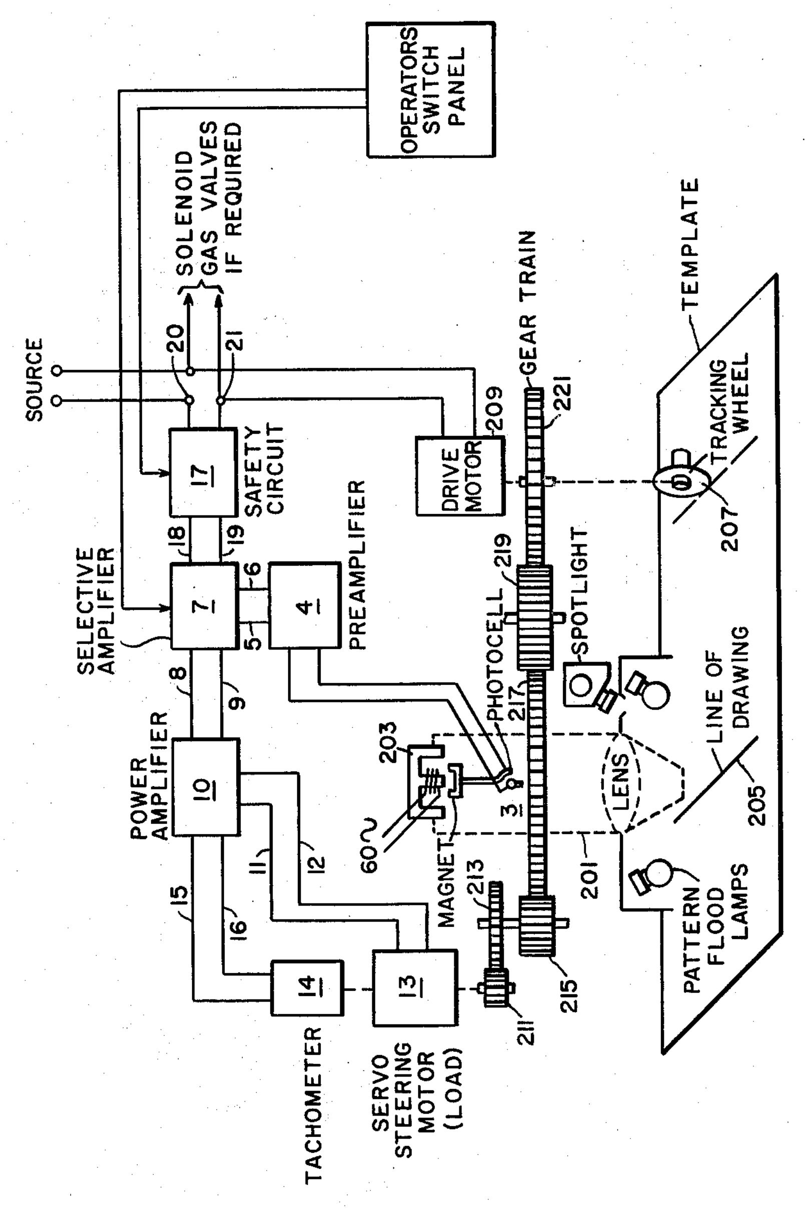
FIGURE 1 is a block diagram of a line tracer according to this invention.

The apparatus shown in FIG. 1 is a line tracer mechanically similar to the one disclosed in Cheverton et al. Patent 2,933,612. This tracer includes a scanning head 201 within which a photocell 3 is mounted to be vibrated by an electromagnet 203 so as to scan a line or boundary 205 on a drawing by back-and-forth movement transversely to the line. The electromagnet 203 is energized at the frequency of the supply and the scanning frequency is equal to this frequency. When the scanning is centered on the line, the frequency of the signal current produced by the cell is twice the frequency of the scanning (120). When the scanning is off center the signal current has a component of frequency equal to the scanning frequency of amplitude and polarity dependent on the extent and direction of the deviations.

The head 201 is moved by a tracking wheel 207 which is driven by a motor 209. The wheel 207 is steered so that the head 201 scans along the line 205 by a servo steering motor 13. The head 201 is mounted rotatably and is coupled to the motor 13 through gears 211, 213, 215, 217. The wheel 207 is coupled to gear 217 through gears 219 and 221. The gear 221 turns the wheel 207 and thus steers the head along the line.

The head 201 is connected to the tool (not shown) which is controlled, through a pantograph. The tool then follows the head 201.

FIGURE 1, also includes preamplifier 4 to which the output from photocell 3 is applied. The output from amplifier 4 is applied through conductors 5 and 6 to selective amplifier 7. The output from selective amplifier 7 is applied through conductors 8 and 9 to power amplifier 10. The output from the power amplifier 10 is applied through conductors 11 and 12 to the load 13 which may be for example an A.C. servo motor but will in any event be some form of electro mechanical transducer which has a mechanical output in accordance with its alternating-current-electrical input.

Mounted on the shaft of the load 13 is a tachometer 14 which is also an electro mechanical transducer, having an alternating voltage output proportional to the velocity of mechanical motion produced by the load 13. A pair of conductors 15 and 16 couple the output of the tachometer back to the power amplifier. To close the servo loop there is the mechanical relationship between load 13 and photocell 3. A safety circuit 17 is connected through conductors 18 and 19 to the selective amplifier 7. This safety circuit controls the motor 209 and gas valves or other equipment (not shown) so that the system may be shut down if the operation is improper or produce an indication of such faulty operation.

In operation, the photocell produces a signal dependent upon its physical relationship to an optically detectable characteristic of the system to be included or controlled by the servo system. The signal produced by the photocell has alternating-current characteristics having a phase and amplitude dependent on the physical relationship of the photocell relative to the optically detectable characteristic to be followed or detected. This signal will then be amplified by the preamplifier 4 and applied to the selective amplifier 7. The selective amplifier corrects for phase errors in the servo loop and at the same time eliminates extraneous signals which may be produced by the photocell under certain circumstances. The resultant alternating current signal is applied to the power amplifier 10 and thence to the load 13. Load 13 then rotates with a direction and velocity dependent upon the signal from the photocell. At the same time the tachometer produces an output dependent upon the velocity produced by load 13. This output is applied back to the power amplifier to stabilize its operation, hence if large signal is applied to the power amplifier causing a large signal to be applied to the load, the gain of the amplifier permits the load to accelerate rapidly. However, a negative signal is applied by the tachometer to the power amplifier to reduce the effective output of the amplifier thus preventing very high velocities from being produced in the load. This means that high gain is permissible in the system without producing overshoot. Sensitivity of the power amplifier is reduced when large signals are produced and yet the sensitivity is high for small signals.

A portion of the output from the selective amplifier 7 is applied to the safety circuit 170. The safety circuit detects the presence of certain characteristic signals from the photocell and in the presence of such signals produces an open circuit between terminals 20 and 21. This open circuit may be used to control further relays or circuits to prevent the operation of the system in the presence of the characteristic signals or indicate such condition.

Figure 2:
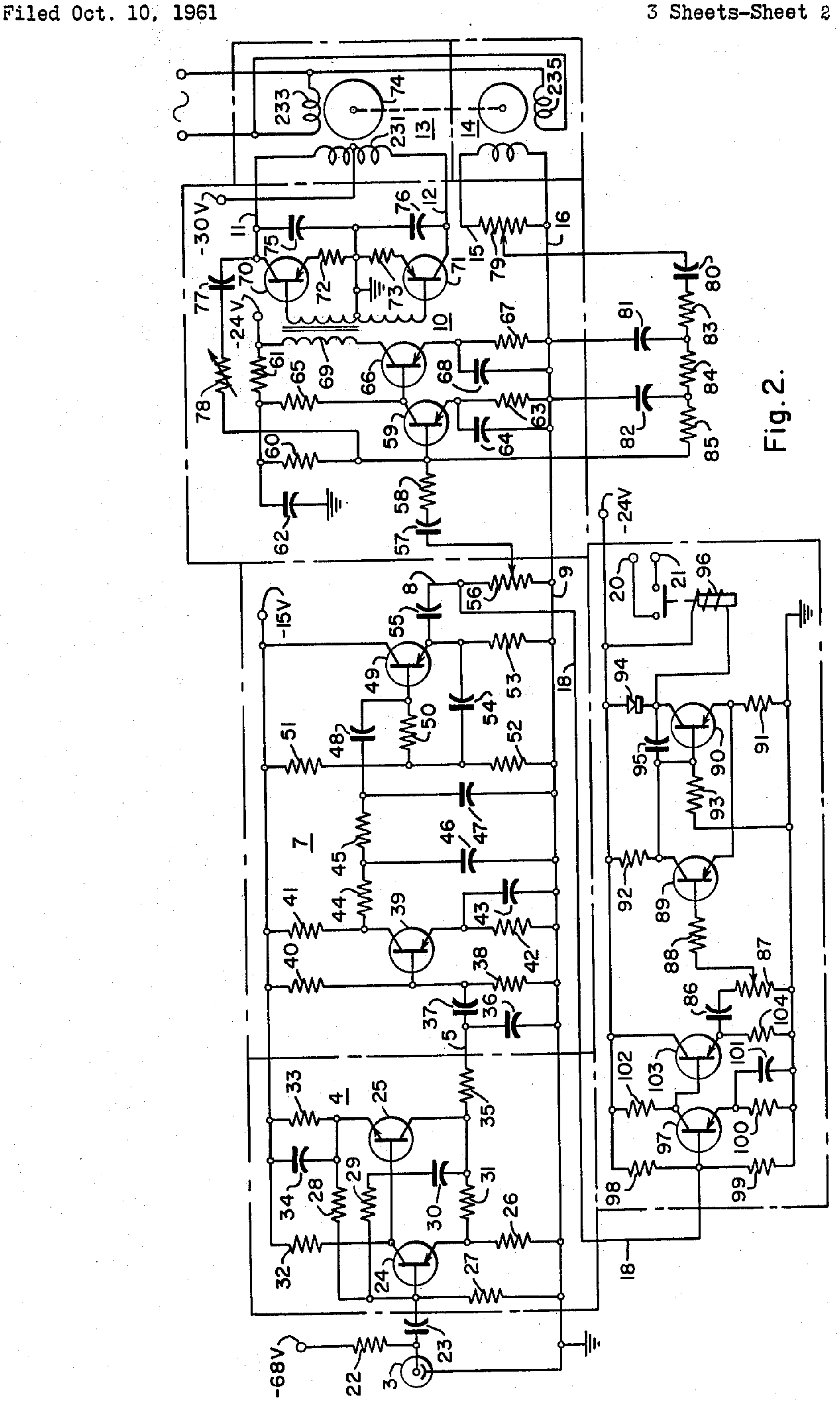
FIGURE 2 is a schematic drawing of the amplifier of the line tracer shown in FIG. 1.

FIGURE 2 is a more detailed description of the system the same designations having been used in this figure as were used in FIGURE 1 where such designations are applicable. Sections designated as blocks in FIGURE 1 have been surrounded with dotted lines in FIGURE 2 and given the same designation.

As will be seen in FIGURE 2, the photocell 3, which may preferably be a high-impedance voltage device, is supplied from a source of direct current through resistor 22. Variations of the illumination falling on photocell 3 produce varying current through resistor 22 producing a voltage fluctuation which is applied through condenser 23 to the base of transistor 24. Transistors 24 and 25 together form a very high input-impedance amplifier. Transistor 24 is preferably a PNP and transistor 25 an NPN. The emitter of transistor 24 is connected through resistor 26 to ground. The base of transistor 24 is connected through resistor 27 to ground, and through resistor 28 to the emitter of transistor 25 and through the resistor 29 and condenser 30 to the collector of transistor 25. The emitter of transistor 24 is connected through resistor 31 to the collector of transistor 25. The collector of transistor 24 is connected to the base of transistor 25 and through resistor 32 to a source of negative potential. The emitter of transistor 25 is connected through resistor 33 which is by-passed by condenser 34 to a source of negative potential.

The output of this preamplifier, referred to as preamplifier 4 in FIGURE 1 and also so designated in this figure, is supplied through resistor 35 to the selective amplifier 7 through a network which consists of resistor 35 and condenser 36 to condenser 37 which is connected to the base of transistor 39, the first transistor in the selective amplifier. The base of this transistor is also connected through resistor 40 to a source of negative potential and through resistor 38 to ground. The collector of this transistor is connected through resistor 41 to a source of negative potential. The emitter of transistor 39 is connected to ground through resistor 42 which is by-passed by condenser 43.

The output from this first stage of selective amplifier 7 is coupled to the second stage through a filter network comprising resistors 44 and 45 and condensers 46 and 47 and thence through condenser 48 to the base of transistor 49 which is the second transistor in this amplifier. The base of transistor 49 is connected through resistor 50 to a negative potential derived from the potentiometer consisting of resistors 51 and 52 in series between the negative supply line and ground. The collector of transistor 49 is directly connected to the negative supply line. The emitter of transistor 49 is returned to ground through resistor 53 and is also connected to the potentiometer 51, 52 through condenser 54. The output from transistor 49 is derived from the emitter through condenser 55. This output is applied through potentiometer 56 to ground and the output from this latter potentiometer is applied to condenser 57 and resistor 58 to the base of transistor 59 in the power amplifier 10.

The base of transistor 59 is coupled to a source of negative potential through resistor 60. The collector is connected to the source through resistor 45, and is also directly connected to the base of transistor 66. This source is decoupled from the D.C. supply for the next succeeding stage by resistor 61 and condenser 62. The emitter of transistor 59 is connected to ground through resistor 63 bypassed by condenser 64. The emitter of transistor 66 is connected to ground through resistor 67 which is bypassed by condenser 68. The collector of transistor 66 is connected to the source of negative potential through the primary of transformer 69. The secondary of transformer 69 is a center-tapped push-pull secondary each end of which is connected to the base of a transistor 70 and 71 respectively. The emitters of these transistors are returned to ground through resistors 72 and 73 and the center tap of the secondary of transformer 69 is also returned to ground. The collectors of transistors 70 and 71 are connected to a field 231 of a servo motor 74 through conductors 11 and 12. A pair of condensers 75 and 76 are connected from the terminals of field 231 to ground. These condensers serve to tune this circuit and cause it to resonate at the desired operating frequency. By using two condensers one from each collector to ground electrolytic condensers can be used because of the bias so applied. A source of negative potential is connected to a center tap on the field of servo motor 74. A negative feedback circuit consisting of condenser 77 and rheostat 78 is connected between the collector of transistor 70 and the base of transistor 59. The output winding of tachometer 14 is connected through leads 15 and 16 to a potentiometer 79, the slider of which is connected through condenser 80 to a filter network comprising condensers 81 and 82 and resistors 83, 84 to the base of transistor 59 through resistor 85.

A signal is also derived from the top of potentiometer 56 and applied through lead 18 to the safety circuit 17. The input to the safety circuit 17 is applied to the base of transistor 97 which is maintained at a negative potential by a voltage divider comprising resistors 98 and 99, connected between the negative potential and ground. The emitter of transistor 97 is returned to ground through resistor 100 by-passed by condenser 101. The collector of transistor 97 is connected to the base of transistor 103 and through resistor 102 to a source of negative potential. The collector of transistor 103 is connected directly to a source of negative potential and the emitter is connected to ground through resistor 104 and also through condenser 86 and potentiometer 87 to ground. The signal is applied from the slider of potentiometer 87 through resistor 88 to the base of transistor 89.

Transistors 89 and 90 together form a Schmitt circuit which detects the signal level supplied and causes operation of the relay 96. The emitters of transistors 89 and 90 are connected together and to ground through resistor 91. The collector of transistor 89 is connected to a source of negative potential through resistor 92 and also connected to the base of transistor 90, which is connected to ground through resistor 93. The collector of transistor 90 is connected to a source of negative potential through the field of relay 96 and to the base of transistor 90 through the condenser 95. The diode 94 is connected between the collector of transistor 90 and the source of negative potential. The contacts of relay 96 are connected to terminals 20 and 21.

The operation of this circuit may be explained as follows:

The photocell 3 in the system described in our aforementioned patent is oscillated at 60 cycles. The output from this photocell consists of essentially a 120 cycle signal indicating that the apparatus is functioning properly and following a line accurately. A 60 cycle component indicates deviation of the photocell from its correct position which signal is used to orient the system in such a manner as to return it to its proper position. The signal from the photocell is therefore applied through condenser 53 to the preamplifier comprising transistors 24 and 25. The design of this portion of the amplifier is such as to produce a high imput impedance which closely matches the impedance of the photocell thus improving the gain characteristic. This amplifier also has a low output impedance, high gain and good D.C. stability, all of which are useful in this particular application. The variations of potential comprising the signal from photocell 3 which appear on the base of transistor 24 cause a variation in current through transistor 24 which produces a variation in potential at the collector of transistor 24 which in turn is applied directly to the base of transistor 25. This in turn causes a variation of current in transistor 25. Resistors 31 and 26 together form the load for transistor 25 and since the emitter of transistor 24 is connected to a point part way down this load, this produces a D.C. negative feedback which stabilizes the amplifier. Resistor 29 and condenser 30 form an A.C. negative feedback which increases the input impedance of the amplifier. The current variations in transistor 25 produce potential variations at the collector which variations are applied as signals to the selective amplifier 7. Resistor 35 and condenser 36 together form a phase shifting and limiting circuit to prevent the next stage from being over-driven and also to correct for phase error introduced into the servo loop by the scanning mechanism and other parts of the system. This signal after limiting and phase shifting is then applied to transistor 39 through condenser 37. Resistors 44 and 45 together with condensers 46 and 47 form a two-stage filter which eliminates the 120 cycle signal and produces a further phase change. This filter is so designed as to make the final phase compensation necessary to the system to enable the system to function properly.

It is necessary that the control quadrature winding 231 of the servo motor 13 be supplied with an error signal displaced by 90° with reference to the reference potential supplied to winding 233. The phase displacement introduced by the scanner is usually of the order of −70°. The desired phase displacement of −270° is achieved by adding −200° to this −70°. This −200° is achieved by adding three shifts of −67°. One shift is introduced by the network 35–36 in the input to transistor 39 and the others by the filter stages 44–46 and 45–47. The filter stages thus serve as phase shifters as well as filters.

The rejection of the 120 cycle signal by this filter means that the remainder of this amplifier is sensitive only to 60 cycle signals and therefore is responsive only to errors. The output from transistor 39 is therefore applied to this filter and thence to condenser 48 to the base of transistor 49. The variations in potential applied to the base of transistor 49 cause a variation in current which in turn cause a variation in current through resistor 53. This transistor 49 is an emitter follower so that its input impedance is high to minimize the load on the preceding filter phase shift network. The introduction of condenser 54 provides a feedback circuit which increases the input impedance of this circuit. The output from this circuit is applied through condenser 55 to the power amplifier 10 through a gain control potentiometer 56. While the power output circuit comprising transistors 70 and 71 is conventional, the input impedance of transistor 66 is too low to be directly connected to selective amplifier 7. In order to increase the input impedance and increase loop gain, transistor 59 was introduced; this transistor is so arranged as to have a relatively high input impedance and drive the base of transistor 66 directly from its collector. The output from the driver stage 66 is applied to the primary of transformer 69 which drives transistors 70 and 71 causing current through these transistors to vary in antiphase. This output is then applied to the servo motor 74 causing it to rotate with a direction and velocity depending upon the phase and amplitude of the 60 cycle signal applied to the power amplifier from the selective amplifier. The split winding of the servo motor shown is one of two quadrature windings on the motor, and direction of the motor therefore is determined by the phase and amplitude of the current in the winding shown.

With respect to the phase of the current in the remaining quadrature winding 233, it will be noted that the current for the quadrature winding may be supplied from the same source as the alternating current used to energize the whole amplifier. The feedback circuit from transistor 70 to transistor 59 is adjusted to give the required characteristic of this stage by variation of rheostat 78.

The electro mechanical feedback circuit of this portion of the servo amplifier includes tachometer 14 and its generating winding which is coupled to the potentiometer 79. A portion of the signal applied to potentiometer 79 is drived from its slider and applied to the 90° phase shift network consisting of resistors 83 and 84 and condensers 81 and 82 and this signal is applied back to the base of transistor 59. The phase shift is necessary because the exciting winding 235 of the tachometer 14 is supplied in phase with the winding 233.

As previously indicated, the output from this tachometer is proportional to its velocity. This A.C. signal is therefore fed back to the base of transistor 59 reducing the output of the amplifier since it is out of phase with the signal being applied to the base of transistor 59. The amount of signal fed back is dependent upon the velocity of servo motor 74. Therefore the gain of the power amplifier increases as the signal reduces since with reduced signal the velocity of the system is reduced. This means that the amplifier as a whole can be extremely sensitive and react quickly to the small signal levels but at the same time it will not cause excessive acceleration when the system is highly unbalanced resulting in possible overshoot.

The servo motor 13 operates only when its winding 231 receives a signal of the scanning frequency. Under such circumstances it turns the tracking wheel 207 to maintain the scanning centered on line 205.

A portion of the signal from the top of potentiometer 56 is applied to the base of transistor 97. This transistor together with transistor 103 form a two stage amplifier, the second stage being an emitter follower and therefore a low impedance source for the following stage. Coupled to the output of transistor 103 is a potentiometer and a selectable portion of the output is derived from the slider of this potentiometer and applied to the following stages which constitute a Schmitt trigger circuit.

The Schmitt trigger circuit is a well known two-condition device having one condition of stability and capable of being triggered into its other condition by a very small change in input. Transistor 89 is normally non-conducting because its base is at ground potential and its emitter is negative due to current through resistor 91. The collector of transistor 89 is therefore at a negative potential. Since the base of transistor 90 is connected to the collector of transistor 89 it also is at the same negative potential and transistor 90 is conducting to saturation. The current for transistor 90 flows through the coil of relay 96 and this relay is therefore energized closing contacts 20 and 21.

When the signal on the base of transistor 89 is sufficient to overcome the bias on this transistor and cause it to conduct a cumulative effect occurs decreasing the current through transistor 90 which by virtue of the connection back to the emitter of transistor 89 from the top of resistor 91 cause the current in transistor 89 to increase. This effect continues until transistor 90 is cut off and transistor 89 is fully conducting. With transistor 90 cut off, relay 96 is deenergized and contacts 20 and 21 open. Since the control signal applied is 60 cycle A.C. it is necessary to prevent the next positive alternation from decreasing the current in transistor 89 and causing the device to reverse its condition. To this end condenser 95 is connected between the collectors of transistors 89 and 90. This smooths out the ripple present at the collector of transistor 89 holding transistor 90 in its non-conducting state.

If now the signal on the base of transistor 89 is reduced the circuit reverts to its original condition, transistor 90 saturates and relay 96 is energized. It will be noted that relay 96 is energized under normal conditions and therefore the system is fail safe, deenergization of the relay indicates an abnormal condition, either abnormal signal, circuit failure or power failure.

Diode 94 protects the transistors from power surges produced by the inductance of the coil of relay 96. Potentiometer 87 is used to adjust the sensitivity of the circuit so that it is not affected by normal noise and signals produced in the system and only responds to abnormal signal levels.

When, therefore, such a signal change occurs, the system apparently is not tracing a line in its proper manner, the relay deenergizes the contacts open and there is a discontinuity between terminals 20 and 21. This discontinuity may in turn be utilized to control other functions such as shutting off the drive mechanism or other apparatus associated with the servo mechanism. In one case, for example, it may be used to shut off the gas supplied to the cutting torch which the servo mechanism is controlling.

From the foregoing it will be seen that a suitable transistor amplifier for servo application has been provided. It will be evident that various minor modifications may be made to the circuit to adapt it to a particular application. For example, the degree of phase shift introduced by the filter network and by the phase shifting network may be changed depending upon certain circumstances. It may also be necessary to make certain adjustment in component values dependent upon the basic frequency utilized in the servo system. For example the system may be designed for 50 cycles rather than 60 cycles. It may also be found advantageous to introduce a push-pull output transformer in the final amplifier stage. In this way long D.C. supply leads to the servo motor field may be avoided. Under these circumstances the secondary of such a transformer can be connected to the field of the servo motor and the field need not be a split field.

Figure 3:
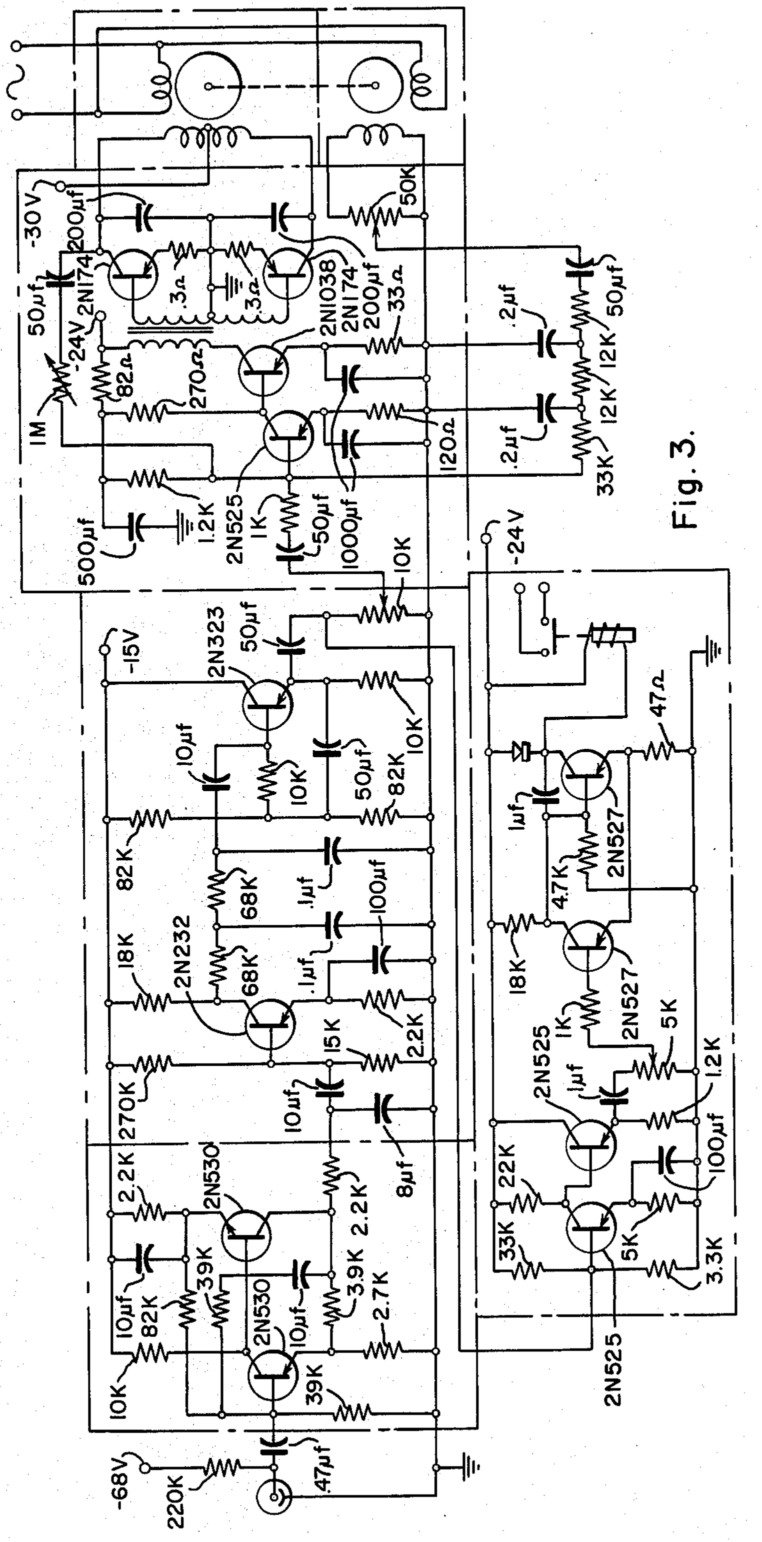
FIGURE 3 is a schematic drawing similar to FIG. 2 but showing the actual components of an amplifier which was built and found to operate satisfactorily.
Figure 4:
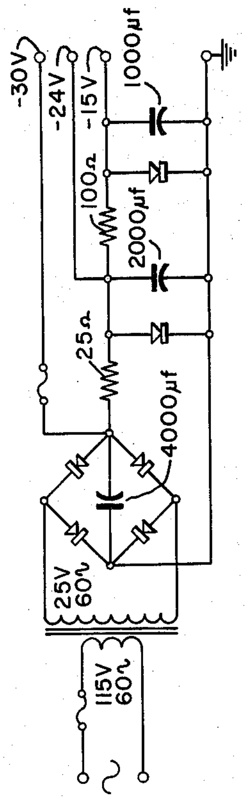
FIGURE 4 is a schematic drawing of the power supply of the amplifier shown in FIG. 3.

Finally the specific values indicated in FIGS. 3 and 4 would vary dependent upon the load, the electro mechanical transducers associated with the system and the photoelectric cell.

I claim as my invention:

1. Apparatus to be energized from an alternating current supply for scanning a boundary including scanning means, means connected to said scanning means for connecting said scanning means to said supply to oscillate said scanning means at the frequency of the alternations of said supply, said connecting means introducing a phase displacement of —P substantially less than —270° in said scanning with respect to said supply, the signal produced by said scanning having a frequency component of twice the frequency of said supply, corresponding to the extent of centering of said scanning, and a component of the frequency of said supply, corresponding to the departure of said scanning from being centered, servomotor means connected to said scanning means for controlling the movement of said scanning means, said motor means including a winding to be energized in quadrature with the alternations of said supply, and selective amplifier means, having an input, connecting said scanning means to said winding to supply control current to said winding, said input including resistance-capacity phase-shift means and said amplifier means in addition including filter means selecting signal components only of the frequency of said alternations for transmission to said winding, said filter means including at least two resistance-capacity networks, said networks superimposing a phase shift on the phase-shift of said phase-shift means, the aggregate phase shift in said signal components at the frequency of said alternations introduced by said phase-shift means and said networks being $-p$ such that $$P+p=270°$$

2. Apparatus to be energized from an alternating current supply for scanning a boundary including scanning means, means connected to said scanning means for connecting said scanning means to said supply to oscillate said scanning means at the frequency of the alternations of said supply, said connecting means introducing a phase displacement of —P, substantially less than —270°, in said scanning with respect to said supply, the signal produced by said scanning having a frequency component of twice the frequency of said supply, corresponding to the extent of centering of said scanning, and a component of the frequency of said supply, corresponding to the departure of said scanning from being centered, servomotor means connected to said scanning means for controlling the movement of said scanning means, said motor means including a winding to be energized in quadrature with the alternations of said supply, and selective amplifier means, having an input, connecting said scanning means to said winding to supply control current to said winding, said input including resistance-capacity phase-shift means and said amplifier means in addition including filter means attenuating substantially, from the signal transmitted to said winding, those signal components, of the signal impressed on said amplifier means, which are of twice the frequency of said alternations, said filter means including at least two resistance-capacity networks, each superimposing a phase shift on the alternations impressed thereon, the aggregate phase shift in signal components at the frequency of said alternations introduced by said phase-shift means and said filter means being $-p$ such that $P+p=270°$.

References Cited by the Examiner

UNITED STATES PATENTS

| | | | |
|---|---|---|---|
| 2,671,875 | 3/54 | Urbanik | 318—20.515 |
| 2,801,342 | 7/57 | Jones | 250—214 |
| 2,864,985 | 12/58 | Beck | 318—207 |
| 2,910,637 | 10/59 | Garnier | 318—207 |
| 2,933,612 | 4/60 | Cheverton et al. | 250—202 |
| 2,951,208 | 8/60 | Barton | 330—14 |
| 2,951,995 | 9/60 | Richner et al. | 330—32 |
| 2,962,665 | 11/60 | Greatbatch | 330—32 |
| 2,986,649 | 5/61 | Wray | 307—88.5 |
| 2,986,651 | 5/61 | Schayes et al. | 307—88.5 |
| 2,988,682 | 6/61 | Wilhelm | 318—31.1 |
| 3,005,915 | 10/61 | White et al. | 250—214 |
| 3,015,780 | 1/62 | Schayes et al. | 330—14 |
| 3,050,669 | 8/62 | Moseley | 318—20.155 |

JOHN F. COUCH, *Primary Examiner.*